(12) United States Patent
Cyrille et al.

(10) Patent No.: US 7,211,195 B2
(45) Date of Patent: May 1, 2007

(54) METHOD FOR PROVIDING A LIFTOFF PROCESS USING A SINGLE LAYER RESIST AND CHEMICAL MECHANICAL POLISHING AND SENSOR FORMED THEREWITH

(75) Inventors: Marie-Claire Cyrille, San Jose, CA (US); Kim Y. Lee, Fremont, CA (US); Jui-Lung Li, San Jose, CA (US); Chun-Ming Wang, Fremont, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 93 days.

(21) Appl. No.: 10/633,765

(22) Filed: Aug. 4, 2003

(65) Prior Publication Data

US 2005/0032248 A1 Feb. 10, 2005

(51) Int. Cl.
*B44C 1/22* (2006.01)

(52) U.S. Cl. .................................................. 216/22

(58) Field of Classification Search ............ 216/22, 216/40, 88, 89; 29/603.01, 603.07, 603.16; 438/690, 692; 360/313–328
See application file for complete search history.

(56) References Cited

U.S. PATENT DOCUMENTS

| | | | |
|---|---|---|---|
| 6,030,753 A | 2/2000 | Lin | |
| 6,218,056 B1 | 4/2001 | Pinarbasi et al. | |
| 6,274,025 B1 | 8/2001 | Chang et al. | |
| 6,669,983 B2 * | 12/2003 | Kagami et al. | 427/130 |
| 2002/0007550 A1 * | 1/2002 | Shoji | 29/603.07 |
| 2002/0148105 A1 | 10/2002 | Han et al. | |
| 2004/0027730 A1 * | 2/2004 | Lille | 360/322 |

FOREIGN PATENT DOCUMENTS

| | | |
|---|---|---|
| EP | 0341843 A2 | 11/1989 |
| JP | 7161711 A | 6/1995 |
| JP | 9198624 A | 7/1997 |

* cited by examiner

*Primary Examiner*—Parviz Hassanzadeh
*Assistant Examiner*—Roberts Culbert
(74) *Attorney, Agent, or Firm*—Chambliss, Bahner & Stophel, P.C.; David W. Lynch

(57) ABSTRACT

A method for providing a liftoff process using a single layer resist and chemical mechanical polishing and sensor formed therewith are disclosed. Chemical mechanical polishing is combined with liftoff using only a single resist layer to allow the removal of leftover fencing on the side of a lifted resist pattern.

12 Claims, 10 Drawing Sheets

Fig. 5 (ABS)

METHOD FOR PROVIDING A LIFTOFF PROCESS USING A SINGLE LAYER RESIST AND CHEMICAL MECHANICAL POLISHING AND SENSOR FORMED THEREWITH

BACKGROUND OF THE INVENTION

1. Field of the Invention

This invention relates in general to the manufacture of magnetic sensors, and more particularly to method for providing a liftoff process using a single layer resist and chemical mechanical polishing and sensor formed therewith.

2. Description of Related Art

Magnetoresistive (MR) read transducers are employed extensively for reading magnetically recorded data, typically recorded in parallel tracks on magnetic disk or on magnetic tape. Anistropic magnetoresistive (AMR) heads are one type of magnetoresistive head and include an AMR sensor contacted by longitudinal bias and conductor leads films. Typically, the AMR sensor and bias and conductor films are sandwiched between inductive write films, or between an inductive write film and a shield.

The AMR sensor typically includes a ferromagnetic sense layer separated by a nonmagnetic spacer layer from a ferromagnetic reference layer. The reference layer generates a transverse bias reference field, either by activation from the current supplied to the sensor for sensing the resistance of the sense layer, or by being pinned in a transverse direction through exchange coupling between the reference layer and an underlying ferromagnetic pinning layer. The transverse bias is conventionally used to maintain the sensor in its most linear operating range.

Longitudinal bias is conventionally required to reduce Barkhausen noise for the stabilization of MR sensors. Two major types of longitudinal bias are currently utilized, the overlaid longitudinal bias wherein separate longitudinal bias layers overlay the sense layer in each of the end regions, and the abutting longitudinal bias wherein the sense layer is only in the center region and the bias layers abut and are adjacent the sense layer in the end regions.

Another magnetoresistive head gaining in usage is the giant magnetoresistive sensor (GMR), which employs pinned and free ferromagnetic layers separated by a thin film layer of nonmagnetic material. The voltage across the GMR sensor is related to the rotation of the magnetization in the free ferromagnetic layer as a function of the magnetic field being sensed. Although the mechanism for sensing the magnetic field of the data being sensed is different from the magnetoresistive effect of the AMR sensor, the GMR sensor must also be stabilized by a longitudinal bias field. Typically, the GMR sensor is stabilized by overlaid longitudinal bias layers at each end of the sensor, although abutting longitudinal bias is also employed.

Magnetic head assemblies are typically made of multiple thin film layers, which are patterned to form various shaped layers in the head. Some of the layers are plated while other layers are sputter deposited on a wafer substrate. The read head portion of a magnetic head assembly includes multiple layers that are typically sputter deposited. For example, the multiple layers of a read sensor, hard bias and lead layers connected to the sensor and first and second read gap layers below and on top of the sensor are typically sputter deposited.

The longitudinal bias layers are conventionally overlaid with conductors, which comprise the conductor, leads at each end of the sensor. A current is supplied between the conductors which is conducted by the longitudinal bias layers to each end of the sense layer(s) and the voltage generated by the current across a central region of the sense layer(s) between the bias layers is the sense signal representative of the sensed recorded data. Thus, the active width of sense layer is defined by the central region between the longitudinal bias layers at each end of the sense layer central region.

A key dimension for MR transducers is the width of the active sense region, which defines the trackwidth of the recorded data that is read. If the active sense region width is narrower and more precisely defined, the data tracks of recorded data may be narrower and closer together, thereby allowing more tracks on the same dimensioned recording media and thereby increasing the data capacity of the recording media.

The read head portion of a magnetic head assembly, which includes multiple layers, is typically formed using sputter deposition techniques. For example, the multiple layers of a read sensor, hard bias and lead layers connected to the sensor and first and second read gap layers below and on top of the sensor are typically sputter deposited. For example, a full film layer of the required material may be sputter deposited on a wafer substrate. A patterned photoresist layer is formed on the layer and the exposed portion of the layer is ion-milled away. Then, the photoresist layer is removed leaving the desired shaped layer that was protected therebelow.

This method of shaping sputter deposited layers has been generally superseded by a bilayer lift-off mask scheme. The bilayer lift-off mask is employed for the purpose of making contiguous junctions of the first and second lead layers with first and second side edges respectively of the read sensor. Multiple read sensor layers are sputter deposited in full film on the wafer substrate followed by formation of the bilayer lift-off mask covering a read sensor site. Ion milling is then employed to remove all of the read sensor material except that below the mask. Full films of hard bias and lead layer materials are then sputter deposited which cover the top of the lift-off mask and an area surrounding the lift-off mask.

It is important that the height of the undercuts be greater than the thickness of the hard bias and lead layers. This is so a photoresist stripper can reach the bottom release layer. The stripper is then introduced which dissolves the bottom release layer causing the bilayer lift-off mask and the hard bias and lead materials deposited thereon to be released from the wafer substrate leaving the aforementioned contiguous junctions between the first and second lead layers and the first and second side edges respectively of the read sensor.

The bilayer lift-off mask scheme has significantly improved the making of read heads by forming contiguous junctions between the lead layers and the read sensor. Less processing steps are required and the profile of the lead and hard bias layers above the read sensor has been reduced. Unfortunately, bilayer lift-off masks limit the track width of read heads. The more narrow the track width the greater the tracks per inch (TPI) that can be read by the read head from a rotating magnetic disk. Accordingly, the greater the tracks per inch the greater the storage capacity of a disk drive employing such a read head.

Theoretical drawings of MR heads indicate that the edges of the longitudinal bias layers and the leads are perfectly aligned and perfectly vertical, either in the overlaid longitudinal bias or the abutting longitudinal bias. However, current processing control of the length and height of the undercut has not been precise enough for current track widths goals. Conventional manufacturing produces edges that are less than perfectly aligned and less than perfectly vertical. Long first and second undercuts leave insufficient release layer material which can cause the bilayer lift-off mask to be separated from the substrate or topple over during subsequent processing steps of ion milling and sputter deposition. If the undercut is too short fencing can occur. Fencing is deposition of the sputtered material across the height of the undercut.

In a mass production environment, the design of the disk file must accommodate the various active areas of MR read transducers. Therefore, the more difficult it is to align the edges, the more difficult it is to define the width of the active sense region, and the parallel tracks of recorded data must be located further apart to accommodate the various widths of the active sense region of the manufactured transducers. Also, the ion-milling process required with bilayer liftoff mask attacks the tip photoresist layer and thereby reduces its width.

It can be seen that there is a need for a method for providing a liftoff process using a single layer resist and chemical mechanical polishing and sensor formed therewith.

SUMMARY OF THE INVENTION

To overcome the limitations in the prior art described above, and to overcome other limitations that will become apparent upon reading and understanding the present specification, the present invention discloses a method for providing a liftoff process using a single layer resist and chemical mechanical polishing and sensor formed therewith.

The present invention solves the above-described problems by combining chemical mechanical polishing with liftoff using only a single resist layer. This process allows the removal of leftover fencing on the side of the lifted resist pattern so that narrower trackwidths may be obtained.

A method for forming leads according to an embodiment of the present invention includes forming a liftoff mask having a desired width, forming leads contiguous to and on opposite sides of the liftoff mask, removing the liftoff mask, the removal of the liftoff mask leaving fencing on the leads, forming a layer of carbon over the leads and performing chemical mechanical polishing on the leads at the fencing to preferentially remove the fencing.

In another embodiment of the present invention a method for forming a magnetic read sensor is provided. This method includes forming a magnetoresistive sensor element and forming leads to the magnetoresistive sensor element, the forming the leads to the magnetoresistive sensor element further including forming a liftoff mask having a desired width over the magnetoresistive sensor element, forming leads contiguous to and on opposite sides of the liftoff mask and in contact with the magnetoresistive sensor element, removing the liftoff mask, the removal of the liftoff mask leaving fencing on the leads, forming a layer of carbon over the leads and performing chemical mechanical polishing on the leads at the fencing to preferentially remove the fencing.

In another embodiment of the present invention a magnetic read sensor is provided. The magnetic read sensor includes a magnetoresistive sensor element and leads, coupled to the magnetoresistive sensor element, the leads to the magnetoresistive sensor element created by forming a liftoff mask having a desired width over the magnetoresistive sensor element, forming leads contiguous to and on opposite sides of the liftoff mask and in contact with the magnetoresistive sensor element, removing the liftoff mask, the removal of the liftoff mask leaving fencing on the leads, forming a layer of carbon over the leads and performing chemical mechanical polishing on the leads at the fencing to preferentially remove the fencing.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method for providing a liftoff process using a single layer resist and chemical mechanical polishing and sensor formed therewith. The present invention combines chemical mechanical polishing with liftoff using only a single resist layer. This process allows the removal of leftover fencing on the side of the lifted resist pattern so that narrower trackwidths may be obtained.

Figure 1:
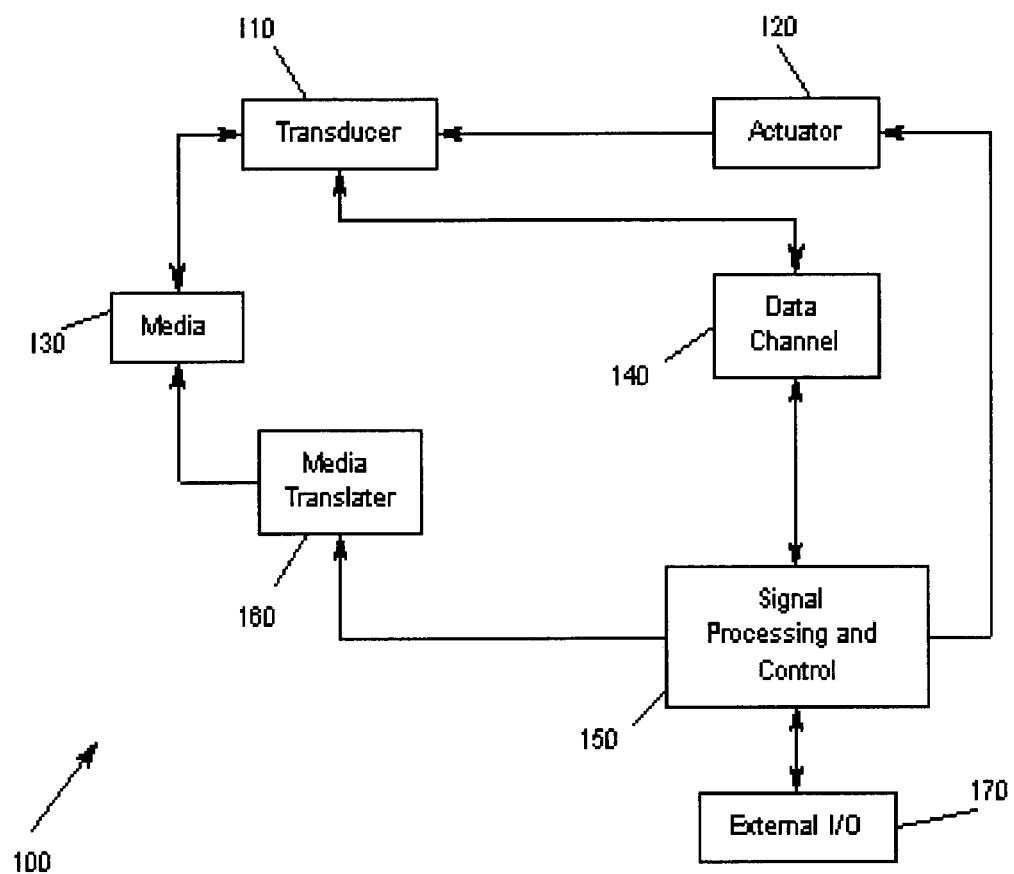
FIG. 1 illustrates a storage system according to an embodiment of the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application, which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
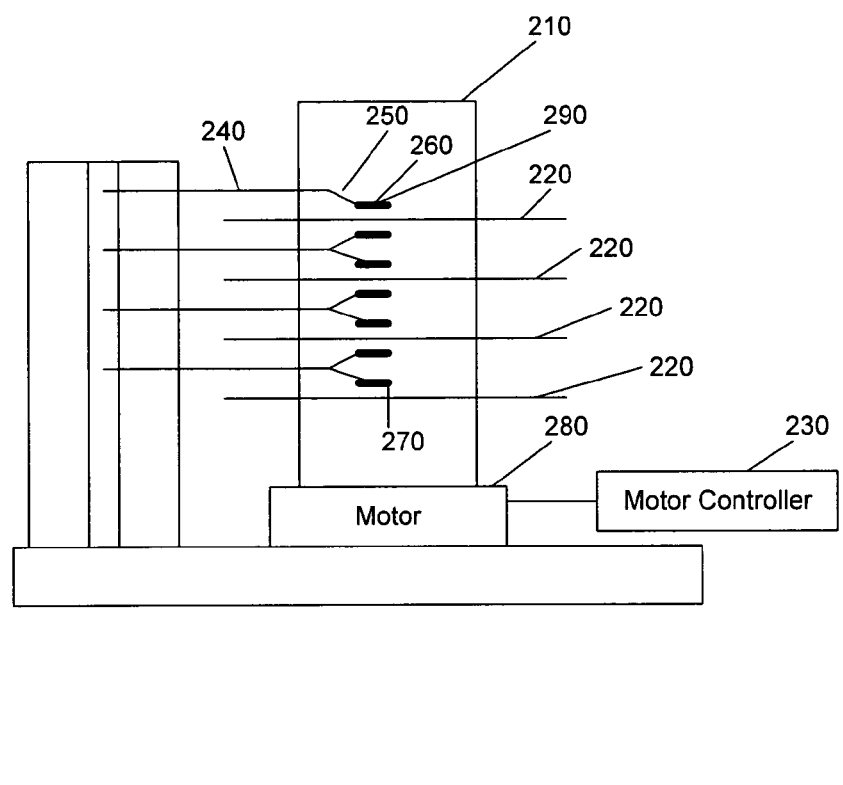
FIG. 2 illustrates one storage system according to an embodiment of the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 260 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air (air bearing) between the surface of disk 220 and the ABS 290. Read/write magnetic head 270 may then be employed for writing information to multiple circular tracks on the surface of magnetic disk 220, as well as for reading information therefrom.

Figure 3:
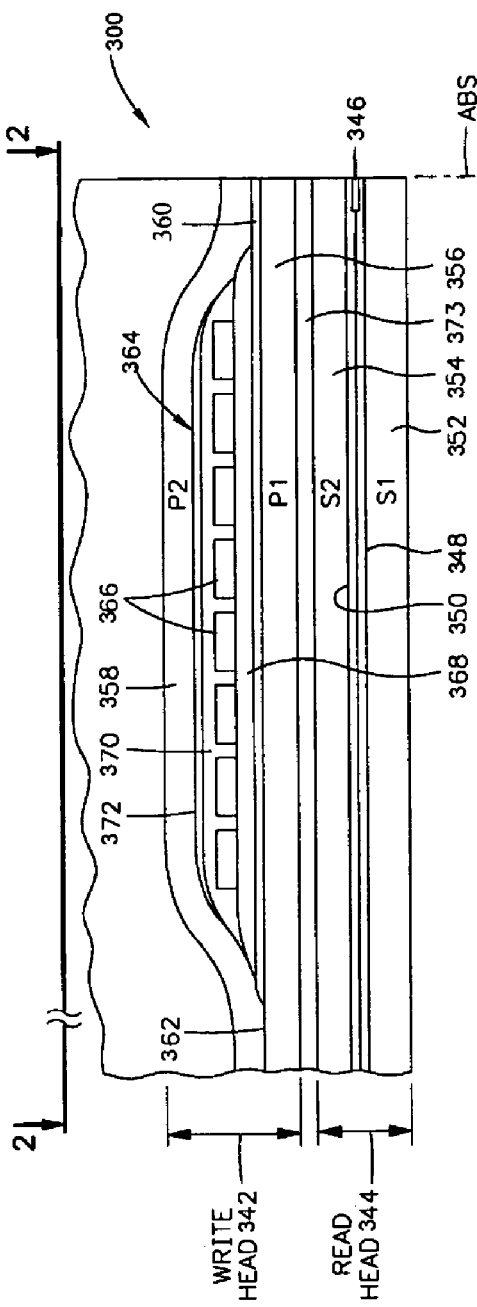
FIG. 3 is a longitudinal cross-sectional view of a portion of a magnetic head assembly including a read head and a write head.

FIG. 3 shows a magnetic head assembly 300. In FIG. 3, the magnetic head assembly 300 has a write head portion 342 and a read head portion 344. The read head portion includes a multilayered read sensor 346, which is located between nonmagnetic electrically insulative first and second read gap layers 348 and 350. First and second lead layers are connected to first and second side edges of the read sensor 346. The read sensor 346 and the first and second lead layers are located between nonmagnetic electrically insulative first and second read gap layers 348 and 350. In a merged magnetic head assembly the second shield layer 354 also serves as a first pole piece layer 356 of the write head.

The write head includes first and second pole piece layers 356 and 358 wherein the second pole piece layer is separated from the first pole piece layer 356 by a nonmagnetic write gap layer 360 in the pole tip region and is connected to the first pole piece layer at a back gap 362 in a back gap region. Between the pole tip and back gap regions is a yoke region where an insulation stack 364 is located between the first and second pole piece layers 356 and 358. Embedded within the insulation stack 364 is a pancake-shaped coil 366 which is located between first and second insulation layers 368 and 370 of the insulation stack and is capped by a third insulation layer 372 to smooth out ripples caused by the coil layer 366. The first pole piece layer 356 is separated from the second shield layer 354 by a nonmagnetic layer 373. Since the first pole piece layer 356 is separated from the second shield layer 354 this type of head is known in the art as a piggyback head. When the first pole piece layer 356 and the second shield layer are a common layer this is known in the art as a merged head.

Figure 4:
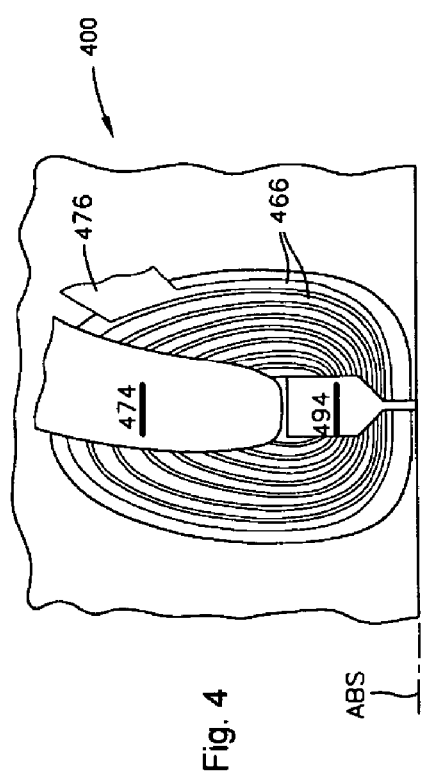
FIG. 4 is a view taken along plane 2—2 of FIG. 3 with all layers above the first insulation layer of the insulation stack removed except the coil layer, first and second leads for the coil layer and a second pole piece layer.
Figure 5:
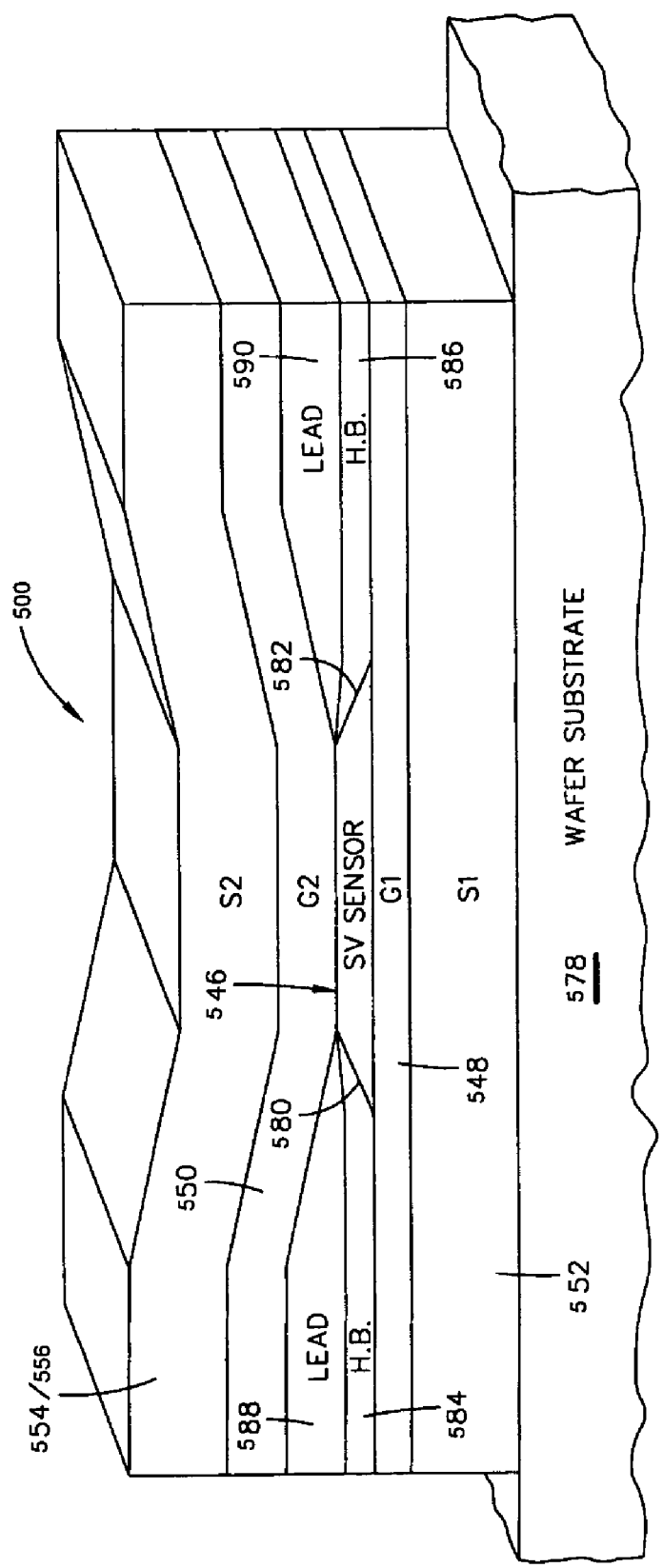
FIG. 5 is an ABS isometric schematic illustration of the read head portion of the magnetic head assembly of FIG. 3.

FIG. 4 is a top view 400 of the magnetic head assembly of FIG. 3. In FIG. 4, the write coil 466 includes first 474 and second 476 leads. The first 474 and second 476 leads are connected to the coil layer 466 and provide a write current thereto. The write coil 466 is sandwiched between first (not shown in FIG. 4) and second 494 pole piece layers. The write coil 466 generates flux at a tip of the pole piece 494 in response to the write current applied to the write coil 466 via first 474 and second 476 leads FIG. 5 is an enlarged isometric ABS illustration of the read head 500 of the magnetic head assembly in FIG. 3. The read head 500 is constructed on a wafer substrate 578. The multilayered sensor 546 has first and second side edges 580 and 582 that are connected to first and second hard bias layers (HB) 584 and 586 and first and second lead layers 588 and 590.

During the construction of the read head 500, the multiple layers of the read sensor 546, hard bias 584, 586 and lead layers 588, 590 connected to the sensor 546 and read gap layers 548, 550 surrounding the sensor are typically sputter deposited. During the processing, a liftoff process is often used to pattern these thin-films. However, the liftoff process may leave fencing, i.e., raised areas of material along the resist line edges after liftoff. Removal of this fencing is critical in preventing electrostatic discharge events in subsequent processing and handling, and in aligning the edges of the thin-films so that the widths of the active sense region of the manufactured transducers are minimized.

According to an embodiment of the present invention, Chemical Mechanical Planarization (CMP) is combined with liftoff using only a single resist layer for defining critical trackwidth in magnetic read heads. During CMP, an object to be polished is mounted in a polishing head that rotates against a polishing pad. Polishing slurry is added and the surface roughness of the object is reduced by a combination of mechanical friction and chemical etching. The material at the highest position experiences the largest mechanical friction and is etched faster than material at lower positions. This difference in etch rates leads to planarization. FIGS. 6–11 illustrate a liftoff process using a single layer resist and chemical mechanical polishing according to an embodiment of the present invention.

Figure 6:
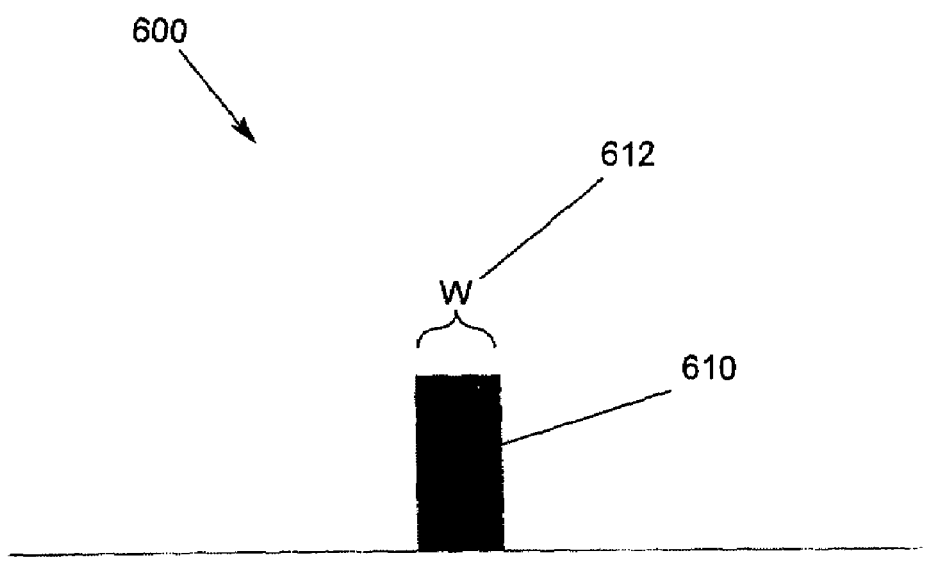
FIG. 6 illustrates the formation of a single layer liftoff mask according to an embodiment of the present invention.
Figure 7:
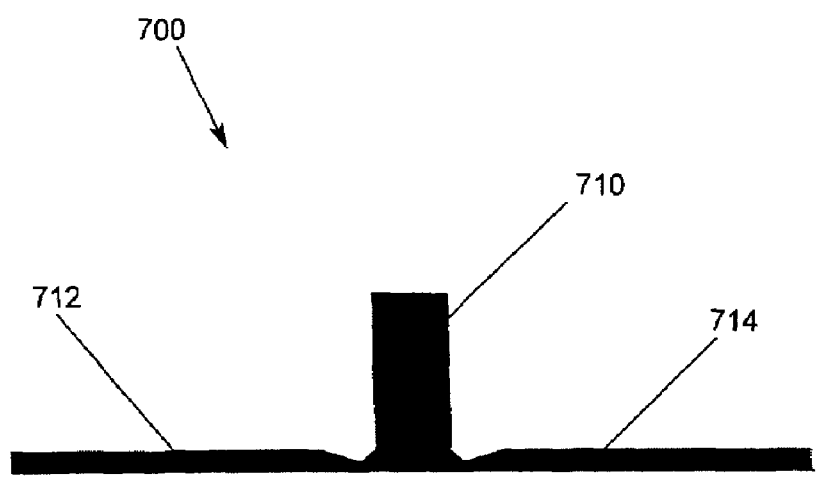
FIG. 7 illustrates the deposition of thin-film lead material about the liftoff mask according to an embodiment of the present invention.

FIG. 6 illustrates the formation of a single layer liftoff mask 600 according to an embodiment of the present invention. In FIG. 6, the liftoff mask 610 comprises a release layer that is formed over a sensor element (not shown). The liftoff mask 610 includes a desired width 612 that is chosen according to the desired trackwidth. FIG. 7 illustrates the deposition of thin-film lead material about the liftoff mask 700 according to an embodiment of the present invention. The lead material 712, 714 abuts against the liftoff mask 710. The lead material 712, 714 slopes due to shadowing by liftoff mask 710 during the sputter deposition process.

Figure 8:
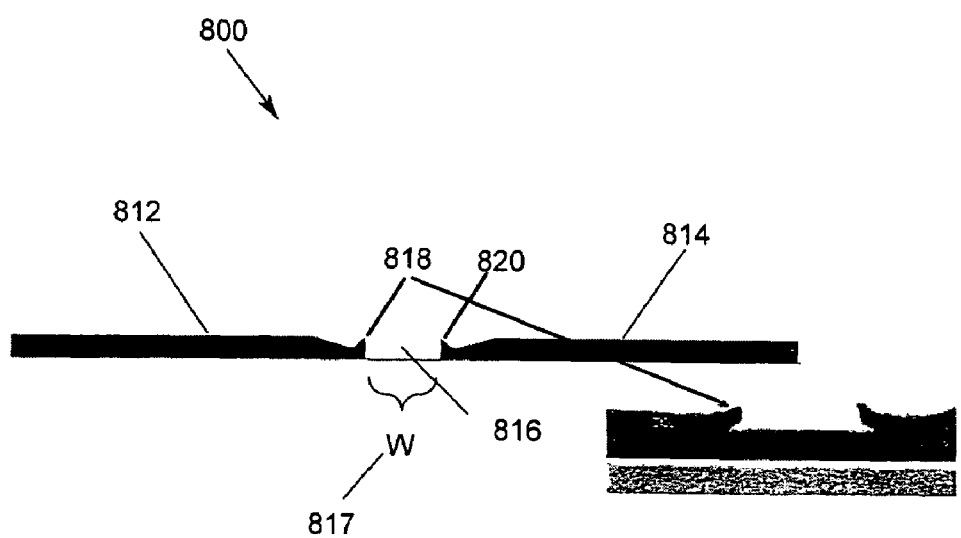
FIG. 8 shows the liftoff mask removed according to an embodiment of the present invention.
Figure 9:
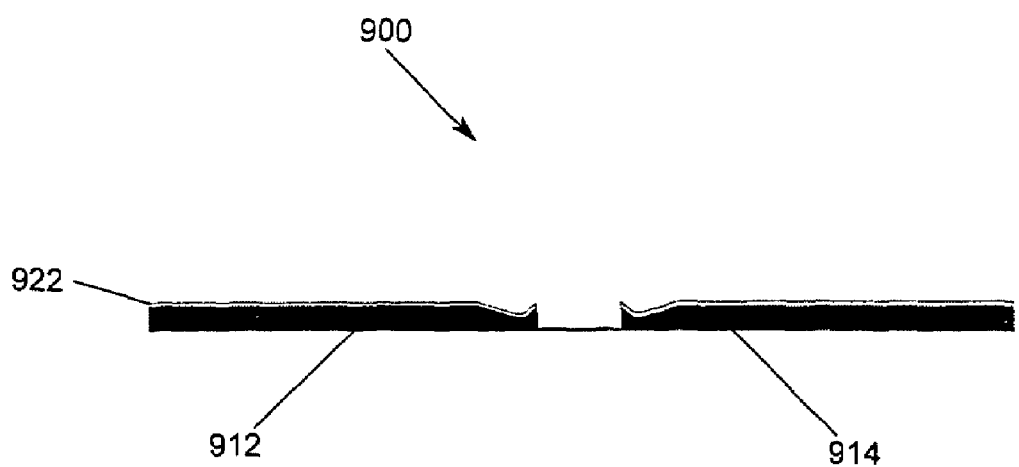
FIG. 9 shows the deposition of a thin carbon layer over the thin-film leads according to an embodiment of the present invention.

FIG. 8 shows the liftoff mask removed 800 according to an embodiment of the present invention. The removal of the liftoff mask leaves a gap 816 with a width 817 and fencing 818, 820 at the leads 812, 814. The fencing 818, 820 is the raised areas of material along the edges of the leads 812, 814 after liftoff. FIG. 9 shows the deposition of a thin carbon layer over the thin-film leads 900 according to an embodiment of the present invention. The carbon layer 922 is formed over the leads 912, 914 and tracks the slope of the thin-film leads 912, 914.

Figure 10:
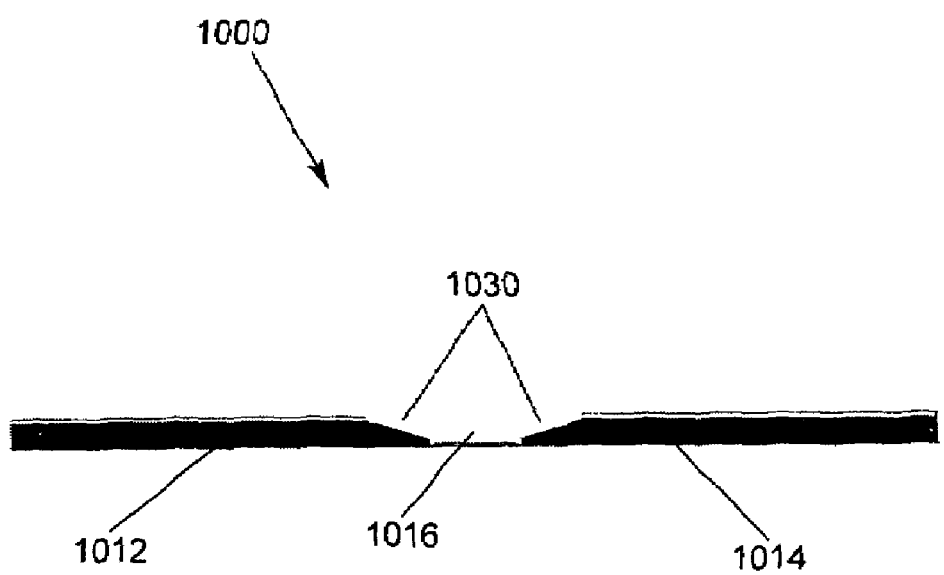
FIG. 10 illustrates the leads after chemical mechanical polishing according to an embodiment of the present invention.
Figure 11:
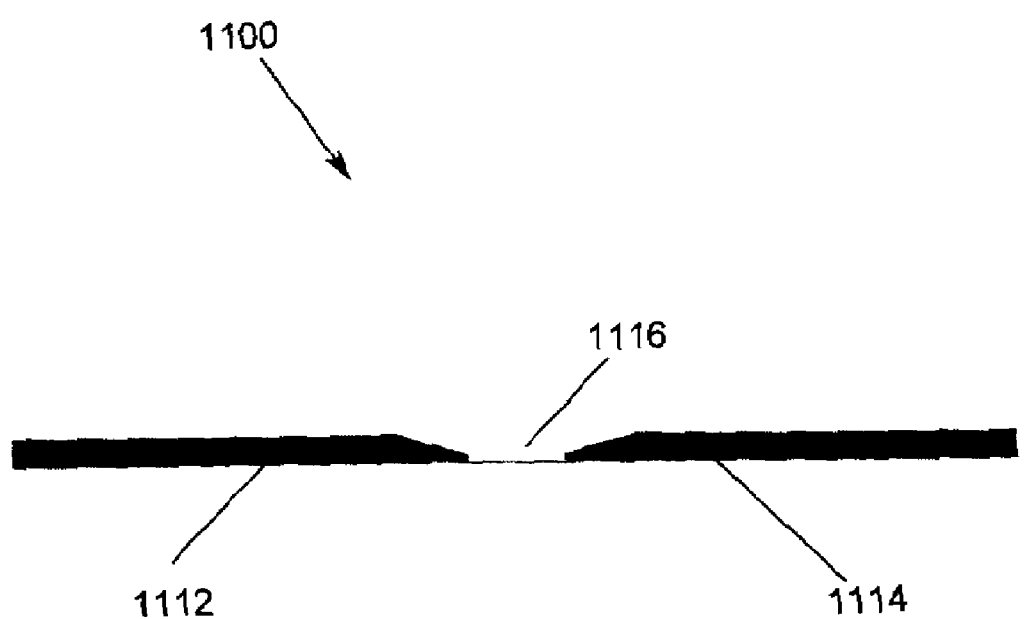
FIG. 11 shows the leads after the carbon layer is removed according to an embodiment of the present invention.

FIG. 10 illustrates the leads after chemical mechanical polishing 1000 according to an embodiment of the present invention. The fencing is preferentially removed by the chemical mechanical polishing process. Thus, the leads 1012, 1014 are provided via the CMP a smoothed surface 1030 to the read gap 1016. FIG. 11 shows the leads after the carbon layer is removed 1100 according to an embodiment of the present invention. The carbon layer may be removed using oxygen plasma. In FIG. 11, the resulting leads 1112, 1114 do not exhibit the fencing and provide the alignment of the edges of the thin-films so that the width 1116 of the active sense region of the manufactured transducers is minimized.

The method for providing a liftoff process using a single layer resist and chemical mechanical polishing according to an embodiment of the present invention provides removal of leftover fencing on the side of the lifted resist pattern so that narrower trackwidths may be obtained. The combination of chemical mechanical polishing with liftoff using only a single resist layer according to an embodiment of the present invention provides read heads with the narrow trackwidths needed for increased a real density magnetic storage.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for forming leads, comprising:
    forming a liftoff mask having a desired width;
    forming leads contiguous to and on opposite sides of the liftoff mask;
    removing the liftoff mask, the removal of the liftoff mask leaving fencing on the leads;
    forming a layer of carbon over the leads after removal of the mask; and
    performing chemical mechanical polishing on the leads at the fencing to preferentially remove a portion of the leads including the fencing and a portion of the carbon layer.

2. The method of claim 1 wherein the desired width of the liftoff mask is a trackwidth for a magnetoresistive sensor.

3. The method of claim 1 wherein the forming a liftoff mask having a desired width further comprises forming a single layer liftoff mask.

4. The method of claim 1, further comprising removing any remaining carbon using an oxygen plasma.

5. The method of claim 1 wherein the forming leads on opposite sides of the liftoff mask further comprises depositing leads using a sputtering process.

6. A method for forming a magnetic read sensor, comprising:
    forming a magnetoresistive sensor element; and
    forming leads to the magnetoresistive sensor element, the forming the leads to the magnetoresistive sensor element further comprising:
        forming a liftoff mask having a desired width over the magnetoresistive sensor element;
        forming leads contiguous to and on opposite sides of the liftoff mask and in contact with the magnetoresistive sensor element;
        removing the liftoff mask, the removal of the liftoff mask leaving fencing on the leads;
        forming a layer of carbon over the leads after removal of the mask; and
        performing chemical mechanical polishing on the leads at the fencing to preferentially remove a portion of the leads including the fencing and a portion of the carbon layer.

7. The method of claim 6 wherein the desired width of the liftoff mask is a trackwidth for the magnetoresistive read sensor.

8. The method of claim 6 wherein the forming a liftoff mask having a desired width further comprises forming a single layer liftoff mask.

9. The method of claim 6, further comprising removing any remaining carbon using an oxygen plasma.

10. The method of claim 6 wherein the forming leads on opposite sides of the liftoff mask further comprises depositing leads using a sputtering process.

11. The method of claim 6 wherein the forming the magnetoresistive sensor element further comprises forming an anisotropic magnetoresistive (AMR) sensor element.

12. The method of claim 6 wherein the forming the magnetoresistive sensor element further comprises forming a giant magnetoresistive (GMR) sensor element.

* * * * *